United States Patent
Yoshinaga

(10) Patent No.: US 11,304,401 B2
(45) Date of Patent: Apr. 19, 2022

(54) WATER ABSORPTION TREATMENT MATERIAL AND METHOD FOR MANUFACTURING THE SAME

(71) Applicant: DAIKI CO., LTD., Tokyo (JP)

(72) Inventor: Junji Yoshinaga, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 629 days.

(21) Appl. No.: 16/050,574

(22) Filed: Jul. 31, 2018

(65) Prior Publication Data

US 2018/0332816 A1    Nov. 22, 2018

Related U.S. Application Data

(63) Continuation of application No. PCT/JP2017/003736, filed on Feb. 2, 2017.

(30) Foreign Application Priority Data

Feb. 29, 2016    (JP) .............................. JP2016-036617

(51) Int. Cl.
  *B01J 20/00*    (2006.01)
  *C09K 3/00*    (2006.01)
  (Continued)

(52) U.S. Cl.
  CPC .......... *A01K 1/0155* (2013.01); *A01K 1/0152* (2013.01); *B01J 20/24* (2013.01);
  (Continued)

(58) Field of Classification Search
  CPC .......... A61F 13/53752; A61F 13/15252; A61F 2013/1526; A61F 2013/530007;
  (Continued)

(56) References Cited

U.S. PATENT DOCUMENTS

| | | |
|---|---|---|
| 5,176,107 A | 1/1993 | Buschur |
| 2011/0253055 A1 | 10/2011 | Tang et al. |
| 2015/0181831 A1 | 7/2015 | Huck et al. |

FOREIGN PATENT DOCUMENTS

| | | | |
|---|---|---|---|
| JP | 2007136154 A | * | 6/2007 |
| JP | 2007-190026 A | | 8/2007 |

(Continued)

OTHER PUBLICATIONS

Machine translation of JP2007136154A (Year: 2007).*

(Continued)

*Primary Examiner* — Haytham Soliman
(74) *Attorney, Agent, or Firm* — Oliff PLC

(57) ABSTRACT

Provided are a water absorption treatment material that can be manufactured at a low cost and in which a clump of used grains can be formed, and a method for manufacturing the same. A water absorption treatment material includes a first grain and a second grain that absorb a liquid. The first grain includes a first core portion and a coating portion. The first core portion has a grain-like shape. The coating portion contains an adhesive material, and covers the first core portion. The second grain includes a second core portion. The second core portion has a grain-like shape. In the second grain, the second core portion is uncovered.

10 Claims, 4 Drawing Sheets

(51) Int. Cl.
*A01K 1/015* (2006.01)
*B01J 20/24* (2006.01)
*B01J 20/26* (2006.01)
*B01J 20/28* (2006.01)
*B01J 20/32* (2006.01)

(52) U.S. Cl.
CPC ......... *B01J 20/26* (2013.01); *B01J 20/28019* (2013.01); *B01J 20/3293* (2013.01)

(58) Field of Classification Search
CPC ........ A61F 2013/530189; A61F 2013/530613; A01K 1/0155; A01K 1/0154; A01K 1/0152; B01J 20/24; B01J 20/26; B01J 20/28019; B01J 20/3293
USPC .......................................... 502/400; 252/194
See application file for complete search history.

(56) References Cited

FOREIGN PATENT DOCUMENTS

| JP | 2010124804 | A | * | 6/2010 | |
|---|---|---|---|---|---|
| JP | WO2008108343 | A1 | * | 6/2010 | ............. A61L 15/60 |
| JP | 2014117676 | A | * | 6/2014 | |

OTHER PUBLICATIONS

Machine translation of JP-WO2008108343-A1 (Year: 2010).*
Machine translation of JP2014117676A (Year: 2014).*
Machine translation of JP2010124804A (Year: 2010).*
Mar. 1, 2019 Supplementary European Search Report issued in European Application No. EP 17 75 9536.

* cited by examiner

WATER ABSORPTION TREATMENT MATERIAL AND METHOD FOR MANUFACTURING THE SAME

CROSS REFERENCE TO RELATED APPLICATION

This is a Continuation of International Application. No. PCT/JP2017/003736 filed Feb. 2, 2017, which claims the benefit of Japanese Application No. 2016-036617 filed Feb. 29, 2016. The contents of these applications are hereby incorporated by reference in their entirety.

TECHNICAL FIELD

The present invention relates to a water absorption treatment material that absorbs a liquid, and a method for manufacturing the same.

BACKGROUND ART

A conventional water absorption treatment material is disclosed in, for example, Patent Document 1. The water absorption treatment material disclosed in Patent Document 1 is an animal excrement treatment material that contains a plurality of grains having a water absorbing property. Each grain includes a core portion that has a grain-like shape, and a coating portion that covers the core portion. The coating portion has a function of bonding grains that have absorbed a liquid when in use. Accordingly, a clump of a plurality of used grains is formed.

CITATION LIST

Patent Document

Patent Document 1: JP 2007-190026A

SUMMARY OF INVENTION

Technical Problem

As described above, the coating portion contributes to formation of a clump of used grains, and is made of a coating material that contains an adhesive material. However, providing each grain with a coating portion requires an increased amount of coating material used, which leads to an increase in the manufacturing cost of the water absorption treatment material.

Solution to Problem

The present invention has been made in view of the problems described above, and it is an object of the present invention to provide a water absorption treatment material that can be manufactured at a low cost and in which a clump of used grains can be formed, and a method for manufacturing the same.

A water absorption treatment material according to the present invention includes: a first grain that absorbs a liquid, the first grain including a first core portion that has a grain-like shape, and a coating portion that contains an adhesive material and covers the first core portion; and a second grain that absorbs the liquid, the second grain including a second core portion that has a grain-like shape, and in the second grain, the second core portion is uncovered.

The water absorption treatment material includes first and second grains. In the first grain, the first core portion is covered by the coating portion containing an adhesive material. On the other hand, in the second grain, the second core portion is uncovered. That is, the second core portion is not coated. By providing only a part of the grains (first grain) with a coating portion as described above, it is possible to save the amount of coating material used. Also, the bonding effect of the coating portion provided in the first grain is also exerted on the second grain around the first grain For this reason, even though the second grain is not provided with a coating portion, a clump composed of used first and second grains is formed.

A method for manufacturing a water absorption treatment material according to the present invention includes a first grain forming step of forming a first grain that absorbs a liquid; a second grain forming step of forming a second grain that absorbs the liquid; and a mixing step of mixing the first and second grains. The first grain forming step includes a first core portion forming step of forming a first core portion that has a grain-like shape, and a coating portion forming step of forming a coating portion that contains an adhesive material and covers the first core portion. The second grain forming step includes a second core portion forming step of forming a second core portion that has a grain-like shape. In the second grain forming step, the second grain in which the second core portion is uncovered is formed.

The manufacturing method includes first and second grain forming steps. In the first grain forming step, a first grain is formed in which a first core portion is covered by a coating portion that contains an adhesive material. In the second grain forming step, a second grain is formed in which a second core portion is uncovered. That is, the second core portion is not coated. By providing only a part of the grains (first grain) with a coating portion as described above, it is possible to save the amount of coating material used. Also, in the manufactured water absorption treatment material, the bonding effect of the coating portion provided in the first grain is also exerted on the second grain around the first grain. For this reason, even though the second grain is not provided with a coating portion, a clump composed of used first and second grains is formed.

Advantageous Effects of Invention

According to the present invention, it is possible to implement a water absorption treatment material that can be manufactured at a low cost and in which a clump of grains can be formed after use, and a method for manufacturing the same.

DESCRIPTION OF EMBODIMENTS

Figure 1:
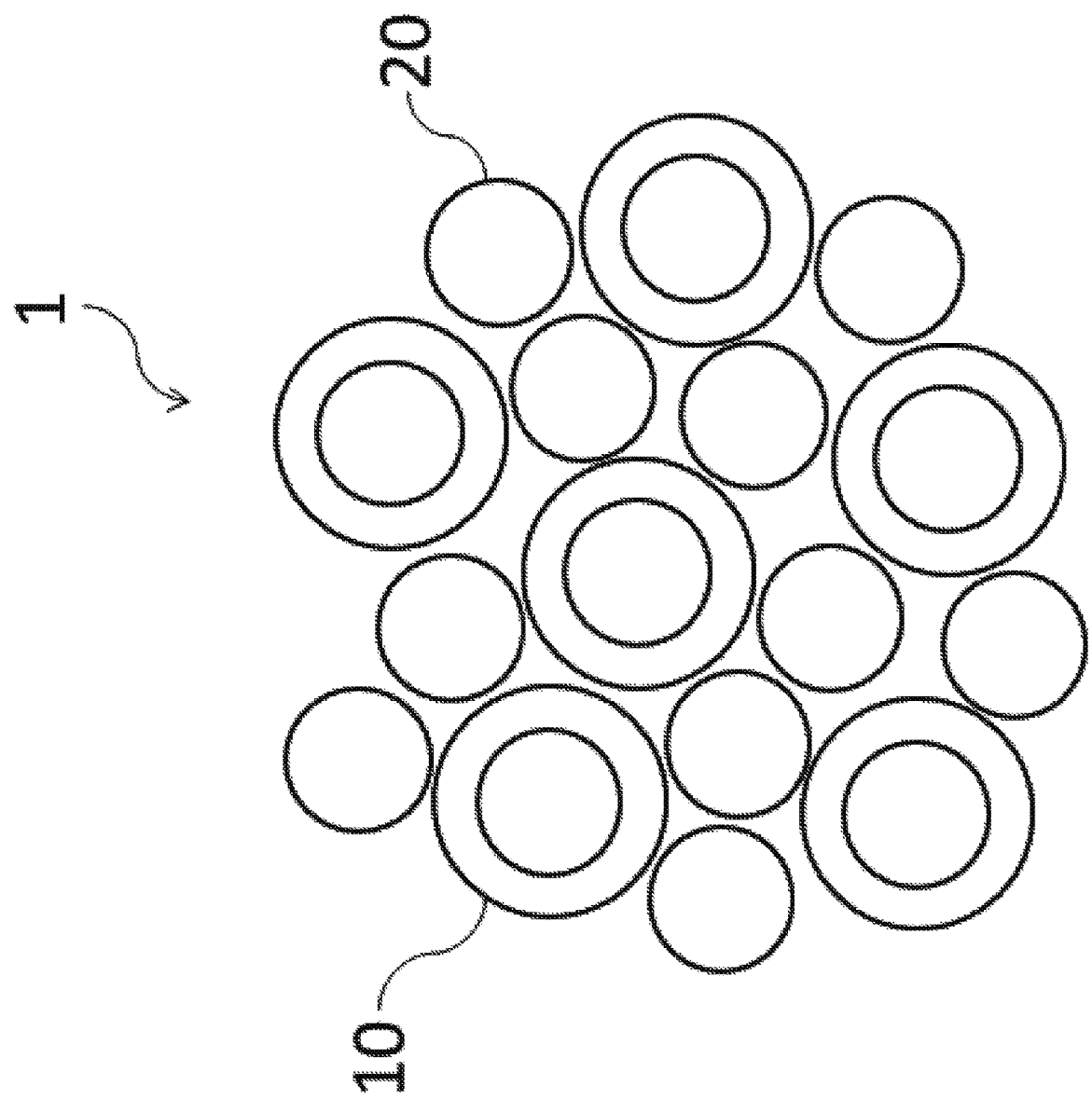
FIG. 1 is a schematic diagram of a water absorption treatment material according to an embodiment of the present invention.

Hereinafter, an embodiment of the present invention will be described in detail with reference to the drawings. In the description of the drawings, the same elements are given the same reference numerals, and a redundant description will be omitted.

FIG. 1 is a schematic diagram of a water absorption treatment material according to an embodiment of the present invention. A water absorption treatment material 1 is a water absorption treatment material. composed of a plurality of grains, and includes a grain 10 (first grain) and a grain 20 (second grain). The grains 10 and 20 have a water absorbing property, and absorb a liquid to be treated. In the present embodiment, a plurality of grains 10 and a plurality of grains 20 are provided. In the water absorption treatment material 1, the grains 10 and 20 are contained in a mixed manner. The number of grains 10 is preferably 30% or more and 70% or less of the total number of grains 10 and grains 20, and more preferably 40% or more and 60% or less. The water absorption treatment material 1 is, for example, an excrement treatment material for absorption treatment of human or animal excrement.

Figure 2:
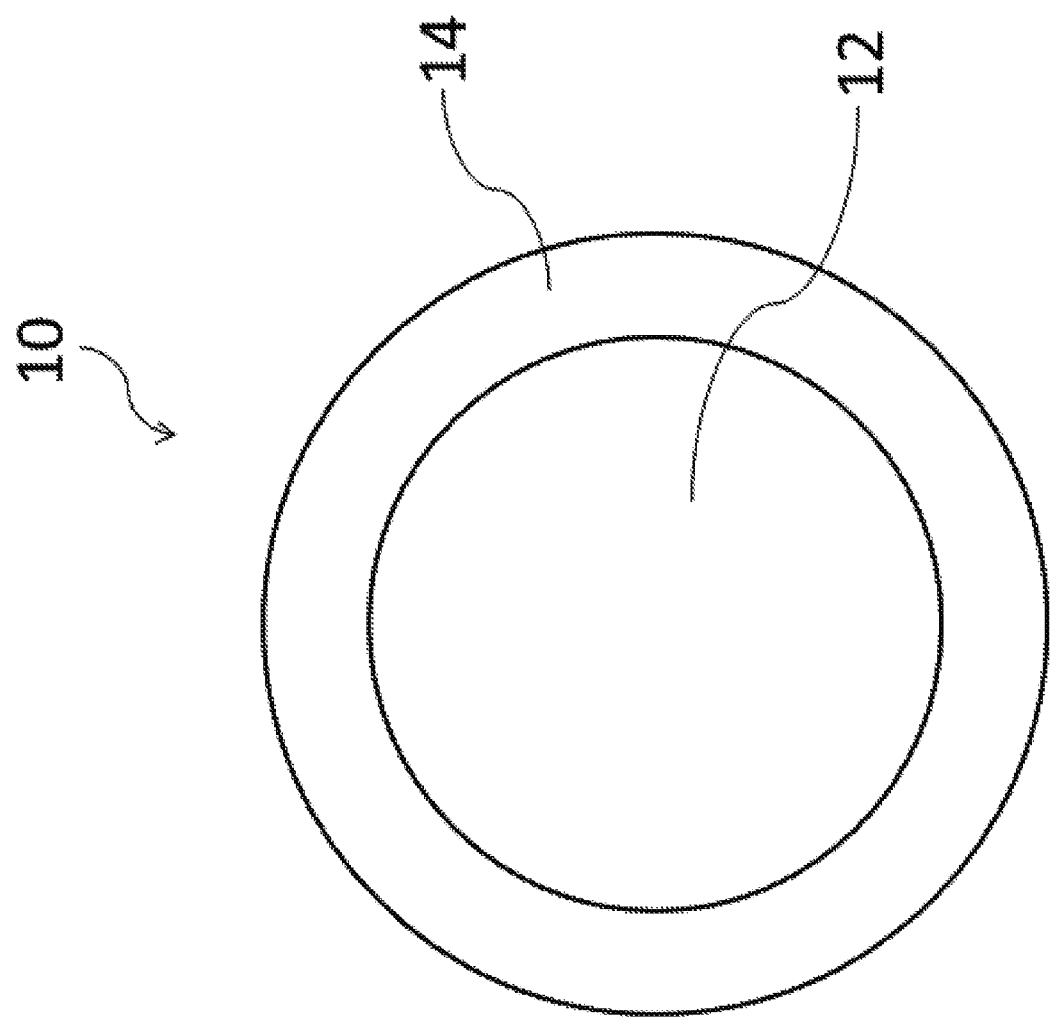
FIG. 2 is a schematic diagram of a grain 10.

FIG. 2 is a schematic diagram of the grain 10. The grain 10 includes a core portion 12 (first core portion) and a coating portion 14. The core portion 12 has a grain-like shape. The grain-like shape may be, for example, spherical, cylindrical, elliptic, or the like. The core portion 12 has a function of absorbing and retaining a liquid. The core portion 12 preferably contains an organic substance as the main material. As used herein, the main material of the core portion 12 refers to one of the materials constituting the core portion 12 that accounts for the highest proportion by weight in the core portion 12. As the organic substance, it is possible to use, for example, paper, used tea leaves, plastics, or soybean refuse. The core portion 12 does not contain an adhesive material.

The paper refers to a material composed mainly of pulp. Examples of the paper include ordinary paper, a vinyl chloride wallpaper classified product (paper obtained by classifying vinyl chloride wallpaper), a fluff pulp, a paper-making sludge, a pulp sludge, and the like. As the plastics, it is possible to use, for example, a disposable diaper classified product (plastics obtained by classifying disposable diapers). The soybean refuse is preferably dried soybean refuse.

The coating portion 14 covers the core portion 12. The coating portion 14 may cover the entire surface of the core portion 12, or may cover only a portion of the surface of the core portion 12. The coating portion 14 has a function of bonding the grains 10 and 20 that have absorbed a liquid. when in use, and clumping them together. The coating portion 14 contains an adhesive material. As the adhesive material, it is possible to use, for example, starch, CMC (carboxymethyl cellulose), PVA (polyvinyl alcohol), dextrin, or a water-absorbent polymer.

It is preferable that the coating portion 14 also contains an organic substance as the main material. The coating portion 14 changes color in response to the grain 10 absorbing a liquid. The coating portion 14 contains a coloring material that produces or changes color due to a reaction with water. As the coloring material, for example, a dye or a pigment can be used.

Figure 3:
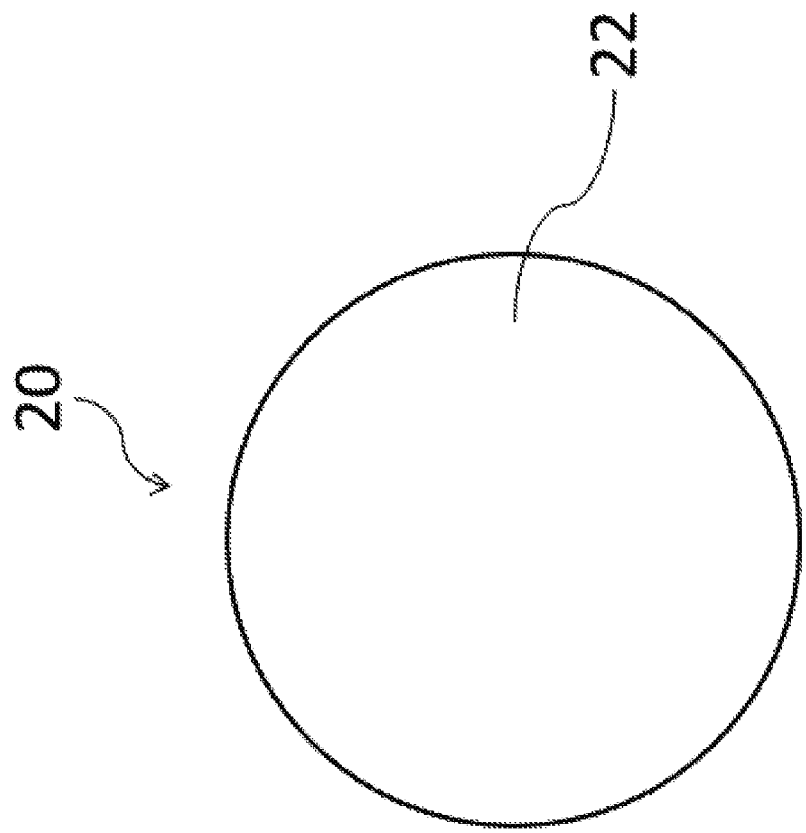
FIG. 3 is a schematic diagram of a grain 20.

FIG. 3 is a schematic diagram of the grain 20. The grain 20 includes a core portion 22 (second core portion). The core portion 22 has a grain-like shape. The core portion 22 has a function of absorbing and retaining a liquid. The core portion 22 preferably contains an organic substance as the main material. In the present embodiment, the core portion 22 is made of materials that have substantially the same composition as that of the core portion 12. The core portion 22 does not contain an adhesive material. Also, the core portion 22 has a shape and a size that are substantially the same as those of the core portion 12. In the grain 20, the core portion 22 is uncovered. A coating portion is not formed on the core portion 22, and thus the entire surface of the core portion 22 is exposed. As described above, the grain 10 has a multi-layer structure composed of the core portion 12 and the coating portion 14, whereas the grain 20 has a single-layer structure composed only of the core portion 22. Before use (before the grain 10 and the grain 20 absorb a liquid), the core portion 22 preferably has substantially the same color as the coating portion 14.

Next, an example of a method for manufacturing the water absorption treatment material 1 will be described as an embodiment of the method for manufacturing a water absorption treatment material according to the present invention. The manufacturing method includes a first grain forming step, a second grain forming step, and a mixing step.

The first grain forming step is a step of forming the grain 10. This step includes a first core portion forming step, and a coating portion forming step. The first core portion forming step is a step of forming the core portion 12. In this step, the core portion 12 is formed by granulating a core portion. material (a material for constituting the core portion 12) by using a granulation apparatus. In the present embodiment, a plurality of core portions 12 are formed. As the granulation apparatus, for example, an extrusion. granulator can be used. Prior to granulation, the core portion material is subjected to pre-treatment such as pulverization, kneading, and adding water, as needed.

The coating portion forming step is a step of forming the coating portion 14. In this step, the coating portion 14 is formed by attaching a coating material to the surface of the core portion 12 by using a coating apparatus or the like. The coating material contains an adhesive material. The coating material may be attached by, for example, sprinkling or spraying the coating material. In this way, the grains 10 are obtained.

The second grain forming step is a step of forming the grain 20. This step contains a second core portion forming step. The second core portion forming step is a step of forming the core portion 22. In this step, the core portion 22 is formed by granulating a core portion. material (a material for constituting the core portion 22) by using a granulation apparatus. In the present embodiment, a plurality of core portions 22 are formed. The core portions 22 are not coated in the second grain forming step. Accordingly, the grains 20 in each of which the core portion 22 is uncovered are obtained.

Figure 4:
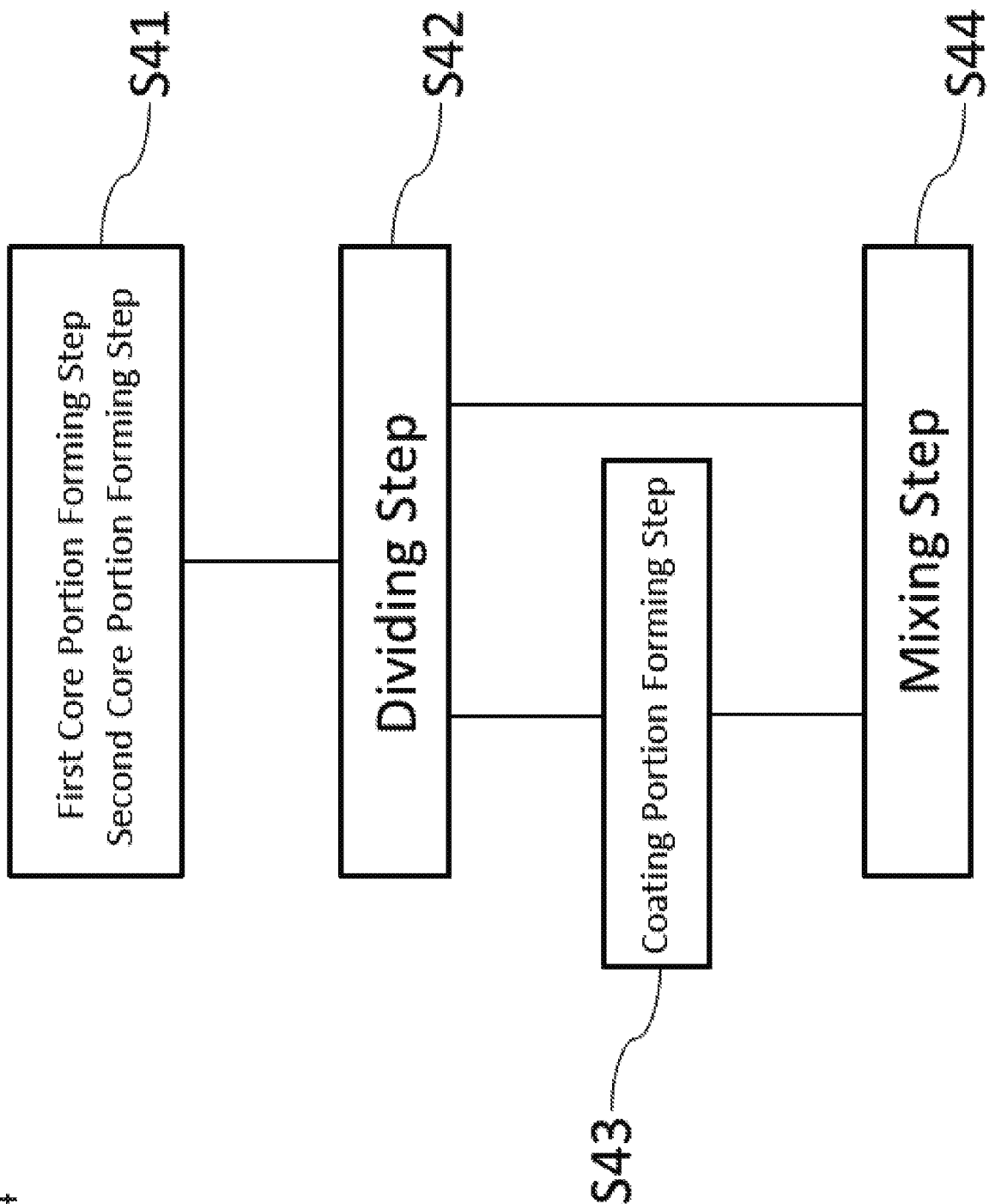
FIG. 4 is a diagram illustrating a flow of a manufacturing method according to an embodiment.

FIG. 4 is a diagram illustrating a flow of the manufacturing method according to the present embodiment. In the present embodiment, the second core portion forming step is performed simultaneously with the first core portion forming step by using the same apparatus (step S41). That is, the first and second core portion forming steps are performed as a single step. In this step, the same core portion material is granulated by using a granulation apparatus so as to form a plurality of granules that will serve as the core portions 12 and the core portions 22. After that, a dividing step is performed (step S42). The dividing step is a step of dividing the plurality of granules into a first group and a second group at a predetermined ratio. The granules in the first group will serve as the core portions 12, and, the granules in the second group will serve as the core portions 22. In the coating portion forming step (step S43), a coating portion (coating portion 14) is formed only on each of the granules in the first group.

The mixing step (step S44) is a step of mixing the grains 10 formed in the first grain forming step and the grains 20 formed in the second grain forming step. In this step, it is preferable to mix the grains 10 and the grains 20 such that the number of grains 10 is 30% or more and 70% or less of the total number of grains 10 and grains 20. It is more preferable to mix the grains 10 and the grains 20 such that the number of grains 10 is 40% or more and 60% or less of the total number of grains 10 and grains 20. In this step, the mixed grains 10 and 20 are preferably stirred, in this way, the water absorption treatment material 1 that contains the grains 10 and the grains 20 in a mixed manner is obtained.

Advantageous effects of the present embodiment will be described. In the present embodiment, the grain 10 and the grain 20 are formed. In the grain 10, the core portion 12 is covered by the coating portion 14 that contains an adhesive material. On the other hand, in the grain 20, the core portion 22 is uncovered. That is, the core portion 22 is not coated. By providing only a part of the grains (grain 10) with a coating portion as described above, it is possible to save the amount of coating material used. Also, the bonding effect of the coating portion 14 provided in the grain 10 is also exerted on the grain 20 around the grain 10. For this reason, even though the grain 20 is not; provided with a coating portion, a clump composed of used grains 10 and 20 is formed. Accordingly, the water absorption treatment material 1 that can be manufactured at a low cost and in which a clump of grains 10 and 20 is formed after use, and a method for manufacturing the same are implemented.

As described above, in order to form a clump composed of a plurality of grains, it is unnecessary for all of the grains to have a coating portion, and it is sufficient that only a part of the grains have a coating portion. A configuration in which all grains have a coating portion as in a conventional water absorption treatment material is problematic in that it not only causes an increase in the manufacturing cost, but also increases the bonding force between grains of the aggregate to an excessive degree, as a result of which the water dispersibility of the water absorption treatment material decreases. As used herein, the water dispersibility refers to the capability of a clump composed of a plurality of used grains disintegrating in water and separating into individual grains. If the water dispersibility is insufficient, when the aggregate is flushed down a flush toilet, it causes a clog in the toilet. In this regard, in the present embodiment, only a part of the grains are provided with a coating portion. An appropriate bonding force between grains is thereby attained, and it is possible to achieve both clump forming function and water dispersibility.

From the viewpoint of saving the amount of coating material used and achieving a reduction in the manufacturing cost, it is advantageous that the grains 10 account for a smaller proportion in the entire water absorption treatment material 1. From this viewpoint, the number of grains 10 is preferably 70% or less of the total number of grains 10 and grains 20, and more preferably 60% or less. If, on the other hand, the proportion of the grains 10 is too small, the bonding effect of the coating portion 14 will be insufficient, which may hinder used grains 10 and 20 from forming a clump. From this viewpoint, the number of grains 10 is preferably 30% or more of the total number of grains 10 and grains 20, and more preferably 40% or more.

The core portion 12 and the core portion 22 are made of materials that have substantially the same composition. Accordingly it is possible to use the same core portion material as the core portion material for forming the core portion 12 and the core portion material for forming the core portion 22. In addition, the core portion 12 and the core portion 22 have substantially the same shape and size. Accordingly it is possible to use the same granulation apparatus as the granulation apparatus for forming the core portion 12 and the granulation apparatus for forming the core portion 22.

In the case where the core portion 12 and the core portion 22 are made of materials that have substantially the same composition, and have substantially the same shape and size, the core portion 12 and the core portion 22 can be formed simultaneously by using the same apparatus. In fact, in the present embodiment, the first and second core portion forming steps are performed simultaneously by using the same apparatus. With this configuration, it is possible to efficiently manufacture the water absorption treatment material 1 that contains the grains 10 and the grains 20 in a mixed manner. This also leads to a reduction in the manufacturing cost of the water absorption treatment material 1.

In the first and second core portion forming steps, a plurality of granules that will serve as core portions 12 and 22 are formed by granulating the core portion material by using a granulation apparatus. After that, the dividing step is performed, and the granules are divided into a core portion 12-forming granule group (first group) and a core portion 22-forming granule group (second group). In this way, the granules formed in the first and second core portion forming steps are subjected to the dividing step, and the granules Are determined as either core portion 12-forming granules or core portion 22-forming granules. Accordingly, during the first and second core portion forming steps, the granules can be handled without the need to make distinction between core portion 12-forming granules and core portion 22-forming granules. For this reason, in the present embodiment, irrespective of the fact that two types of grains (grains 10 and 20) are formed, the first and second core portion forming steps can be performed as a single step as in the case where only one type of grains are formed.

The core portion 12 and the core portion 22 do not contain an adhesive material. Accordingly, it is possible to save the amount of adhesive material that is a relatively expensive material, and further reduce the manufacturing cost of the water absorption treatment material 1.

When the core portion 22 and the coating portion 14 have substantially the same color before use, the water absorption treatment material 1 can have a uniform external appearance irrespective of the fact that two types of grains are contained in a mixed manner. This leads to an improvement in the aesthetic appearance of the water absorption treatment material 1.

The coating portion 14 changes color in response to the grain 10 absorbing a liquid. Accordingly, it is possible to easily visually distinguish used grains 10 and 20 (a clump composed thereof) from unused grains 10 and 20.

The coating portion 14 contains a coloring material that produces or changes color due to a reaction with water. Accordingly, the coating portion 14 that changes color in response to the grain 10 absorbing a liquid can be implemented with a simple configuration. Also, the coloring material is contained only in the coating portion 14 of the core portions 12 and 22 and the coating portion 14, and it is therefore possible to save the amount of coloring material used.

Because water-absorbent polymers have the property of swelling upon absorbing a liquid, the coating portion 14 that contains a water-absorbent polymer deforms and spreads outward around the grain 10 upon absorbing a liquid. As a result, the coating portion 14 merges with the surrounding grains 20, as a result of which a clump of grains 10 and 20 is formed. Accordingly, it is particularly suitable to use a water-absorbent polymer as the adhesive material contained in the coating portion 14.

In the case where the core portion 12 and the coating portion 14 contain an organic substance as the main material, it is possible to obtain grains 10 suitable for being disposed of by incineration. Likewise, in the case where the core portion 22 contains an organic substance as the main material, it is possible to obtain grains 20 suitable for being disposed of by incineration. When the grains 10 and 20 are suitable for being disposed of by incineration, the water absorption treatment material 1 after use can be discarded as combustible trash, and it is therefore possible to improve convenience for the users.

The present invention is not limited to the embodiment given above, and various modifications can be made. In the embodiment given above, an example has been shown in which the first and second core portion forming steps are performed simultaneously by using the same apparatus. However, the first and second core portion forming steps may be performed simultaneously by using different apparatuses. Alternatively, the first and second core portion forming steps may be performed in sequence by using the same apparatus or different apparatuses. In this case, the first core portion forming step may be performed prior to the second core portion forming step, or the second core portion forming step may be performed prior to the first core portion forming step.

In the embodiment given above, an example has been shown in which the core portion 12 and the core portion 22 are made of materials that have substantially the same composition. However, the core portion 12 and the core portion 22 may be made of materials that have mutually different compositions. Also, in the embodiment given above, an example has been shown in which the core portion 12 and the core portion 22 have substantially the same shape and size. However, the core portion 12 and the core portion 22 may have mutually different shapes and sizes.

LIST OF REFERENCE NUMERALS

1 Water Absorption Treatment Material
10 Grain (First Grain)
12 Core Portion (First Core Portion)
14 Coating Portion
20 Grain (Second Grain)
22 Core Portion (Second Core Portion)

The invention claimed is:

1. A water absorption treatment material comprising:
    a first grain that absorbs a liquid, the first grain including a first core portion that is a granule, and a coating portion that contains an adhesive material and covers the first core portion; and
    a second grain that absorbs the liquid, the second grain including a second core portion that is a granule,
    wherein in the second grain, the second core portion is entirely uncovered before the second grain absorbs the liquid, and the first core portion contains an organic substance as its main material, the organic substance being paper, used tea leaves, plastics, or soybean refuse.

2. The water absorption treatment material according to claim 1,
    wherein a plurality of the first grains and a plurality of the second grains are provided.

3. The water absorption treatment material according to claim 2,
    wherein the number of the first grains is 30% or more and 70% or less of a total number of the first and second grains.

4. The water absorption treatment material according to claim 1,
    wherein the first core portion and the second core portion are made of materials that have the same composition.

5. The water absorption treatment material according to claim 1,
    wherein the first core portion and the second core portion have the same shape and size.

6. The water absorption treatment material according to claim 1,
    wherein the adhesive material contained in the coating portion is a water-absorbent polymer.

7. The water absorption treatment material according to claim 1,
    wherein the first and second core portions do not contain an adhesive material.

8. The water absorption treatment material according to claim 1,
    wherein the coating portion and the second core portion have the same color before the first and second grains absorb the liquid.

9. The water absorption treatment material according to claim 1,
    wherein the coating portion changes color in response to the first grain absorbing the liquid.

10. The water absorption treatment material according to claim 9,
    wherein the coating portion contains a coloring material that produces or changes color due to a reaction with water.

* * * * *